March 21, 1939.  E. R. POTTER  2,151,615
DRIVE MEANS FOR POWER LAWN MOWERS
Filed Sept. 1, 1936
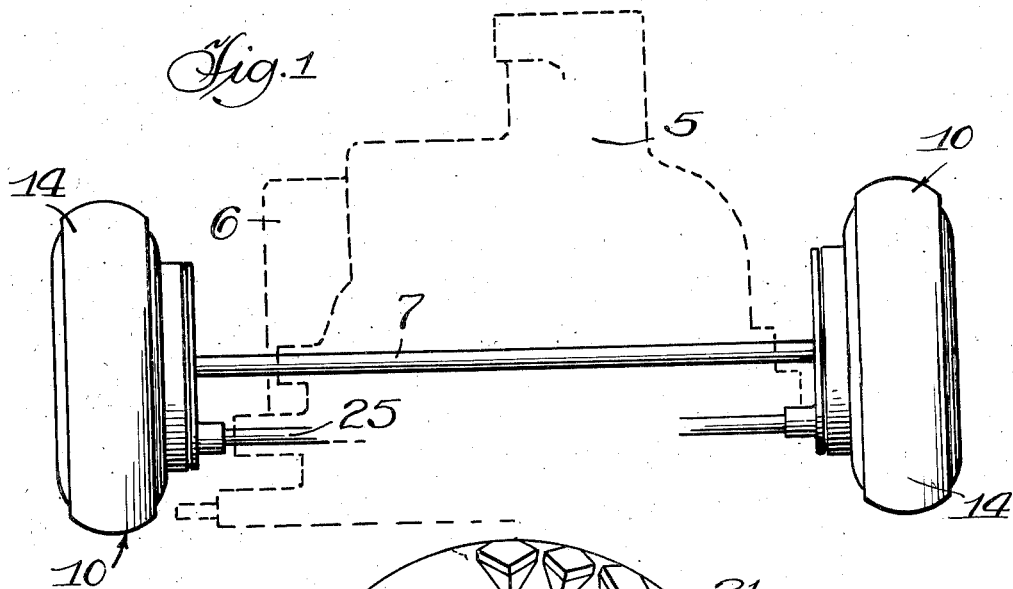
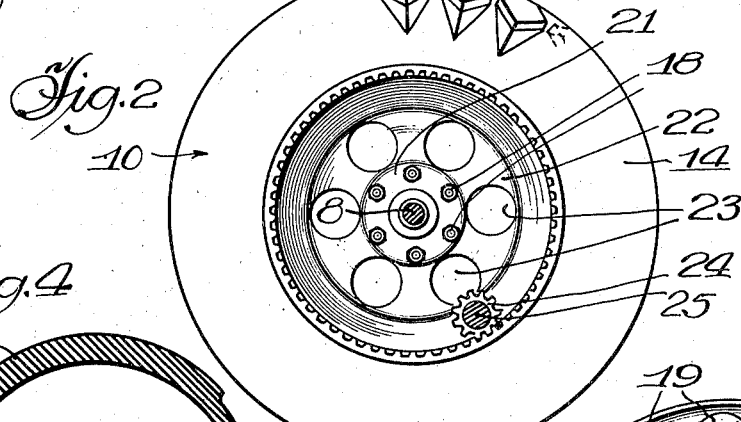
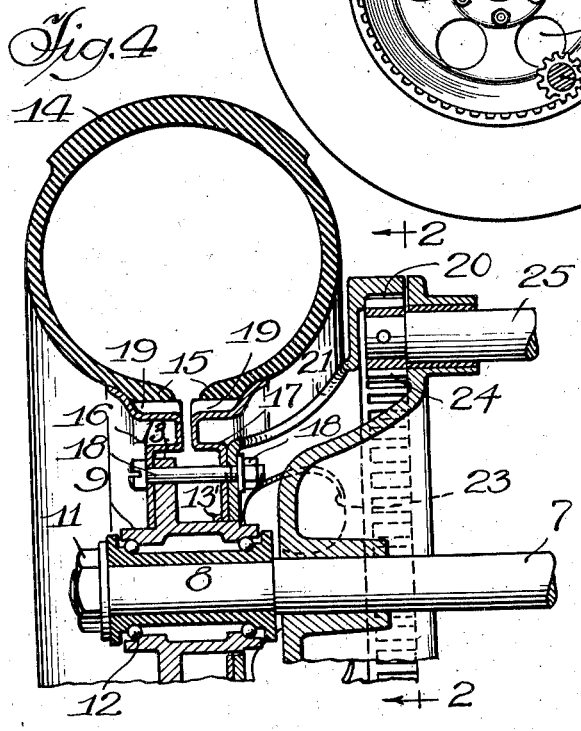
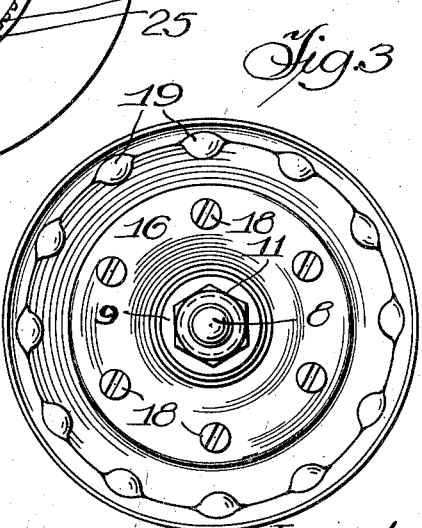
Inventor,
Elbert R. Potter,
Atty.

Patented Mar. 21, 1939

2,151,615

UNITED STATES PATENT OFFICE 2,151,615

DRIVE MEANS FOR POWER LAWN MOWERS

Elbert R. Potter, Chicago, Ill., assignor to Mohawk Equipment Corporation (Ill.), Chicago, Ill.

Application September 1, 1936, Serial No. 98,969

2 Claims. (Cl. 180—75)

This invention relates to drive means for power lawn movers and the like and more particularly to a novel propelling means for use in connection with drive wheels employing pneumatic tires.

Heretofore, the drive wheels have been fixed to a rotating axle so that as the machine is turned, the wheels must slide or drag so that turning and steering is accomplished with some difficulty.

In accordance with the present invention the wheels float or run idle on the axle or spindles thereof so as to facilitate turning or steering, and the invention consists further in a novel wheel construction and arrangement of parts in which the wheels are driven by an internal gear mechanism from the motor of the machine and the invention further consists in a novel internal gear which greatly facilitates and simplifies the assembly construction in connection with the wheels and to generally improve, simplify and enhance the value and efficiency of devices of this class.

With the above and other objects in view, the invention consists in certain novel structure and arrangement of parts to be hereinafter more particularly specified and pointed out in the claims.

In the accompanying drawing:

Figure 1 is an elevation of a power lawn mower showing the drive mechanism in accordance with the invention.

Figure 2 is a sectional elevation taken on the line 2—2 of Figure 4.

Figure 3 is an outside elevation on the same scale as Figure 4, and

Figure 4 is a sectional view of the wheel and drive mechanism.

Referring to the drawing in detail in which similar reference characters designate corresponding parts throughout the several views, and in which the drive mechanism is shown applied to a lawn mower, the motor is designated at 5 and the frame at 6 supporting a fixed axle 7, the spindles 8 of which extend into the hubs 9 of the drive wheels 10 and are retained by nuts 11. These wheels have ball bearings 12 to permit the wheels to turn freely without undue friction. The hubs 9 may have flanges 13 and a pneumatic tire 14 is held on each hub at its rim 15 by hub plates 16 and 17 which are clamped together by bolts 18 passed through registering apertures at the plates. The annular plates form the spoke structure and are preferably crimped or beaded as at 19 adjacent to the rim flanges for strength.

The bolts 18 serve to secure in position an internal gear 20 which has a frusto-conical portion 21 terminating in an annular portion 22 having apertures receiving the fasteners or bolts 18 so as to be clamped against the hub plate 17 and secured to turn with the wheel. The hub plates 16 and 17 are offset laterally in their inner portions as shown more particularly in Figure 4 of the drawing and the assembly thus clamped together fits within the tire at one side, except for the internal gear 20. The frusto-conical portion 21 of the internal gear is provided with holes or apertures 23 to lighten the weight of the structure and the teeth of the internal gear are engaged by a pinion 24 fixed on the outer ends of drive shafts 25 which are driven from the motor 5 and controlled in the usual or any preferred manner to propel the machine.

Suitable means may be provided to prevent the members 17 and 21 and bolts 18 from shifting to the left of Figure 4, such as a second annular flange 13' forming an abutment for the plate 17.

With this invention a very compact and rigid structure is provided by which the internal gears may be rigidly fixed to the wheels and driven and by reason of the construction and arrangement shown and described the hollow annular space inside of each wheel is employed to accommodate the drive mechanism and particularly the internal gears which may be easily assembled to the wheels and clamped in position by the bolts or other suitable retainers. The structure is therefore light and compact.

While I have shown and described my invention in a preferred form, I am aware that various modifications and changes may be made therein without departing from the principles of the invention, the scope of which may be determined by reference to the appended claims.

I claim as my invention:

1. In a drive of the class described, a wheel adapted to rotate on a spindle, said wheel having side plates with a rim, a tire on said rim, an internal gear having a laterally offset portion and an annular portion fitted against one side plate, clamping means passed through said plates and annular portion to clamp the plates together against the tire and to fix the gear thereto against an inner annular portion of the wheel, and a drive shaft having a pinion engaged in the gear.

2. In a drive of the class described, a shaft, wheels journaled on the shaft and each including side plates clamped together, tires held thereon, frusto-conical gear plates, bolts clamping a gear plate to the inner plate of each wheel and fixing the same to rotate therewith, and drive shafts having pinions engaging the gears of the gear plates for driving the latter.

ELBERT R. POTTER.